(12) United States Patent
Hazra (10) Patent No.: US 6,510,553 B1
(45) Date of Patent: Jan. 21, 2003

(54) METHOD OF STREAMING VIDEO FROM MULTIPLE SOURCES OVER A NETWORK

(75) Inventor: Rajeeb Hazra, Beaverton, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/179,491

(22) Filed: Oct. 26, 1998

(51) Int. Cl.[7] .................... H04N 5/445; H04N 5/45
(52) U.S. Cl. .................... 725/87; 725/40; 725/43; 725/90; 348/563; 348/564; 348/565
(58) Field of Search .................... 725/40, 43, 90, 725/87; 348/563–565

(56) References Cited

U.S. PATENT DOCUMENTS

| | | | | |
|---|---|---|---|---|
| 5,453,796 A | * | 9/1995 | Duffield et al. | 348/565 |
| 5,485,221 A | * | 1/1996 | Banker et al. | 348/563 |
| 5,557,338 A | * | 9/1996 | Maze et al. | 348/565 |
| 5,657,092 A | * | 8/1997 | Kim | 348/565 |
| 5,760,820 A | * | 6/1998 | Eda et al. | 348/9 |
| 5,808,659 A | * | 9/1998 | Coutinho et al. | 348/7 |
| 6,057,884 A | * | 5/2000 | Chen et al. | 348/416 |
| 6,243,129 B1 | * | 6/2001 | Deierling | 348/15 |
| 6,295,646 B1 | * | 9/2001 | Goldschmidt Iki et al. | 725/41 |

* cited by examiner

*Primary Examiner*—Andrew Faile
*Assistant Examiner*—Son P. Huynh
(74) *Attorney, Agent, or Firm*—Steven P. Skabrat (57) ABSTRACT

Reception of digital multimedia data signals from multiple sources in a stream over a fixed bandwidth communications path may be accomplished by subscribing to a base layer of a first source and a base layer of a second source, and subscribing to an enhancement layer of the first source. Data signals corresponding to the subscribed layers of the first and second sources may be received in a stream over the fixed bandwidth communications path, output signals may be produced which correspond to the received data signals for the first source, and output signals may be produced corresponding to the received data signals for the second source. The output signals for the first source may be displayed in a first portion or window of a display, and output signals for the second source may be simultaneously displayed in a second portion or window of the display, thereby providing a picture-in-picture (PIP) display for streaming digital video.

19 Claims, 5 Drawing Sheets

METHOD OF STREAMING VIDEO FROM MULTIPLE SOURCES OVER A NETWORK

BACKGROUND

1. Field

The present invention relates generally to processing of multimedia data signals and, more specifically, to management of streaming digital audio and video data signals.

2. Description

Digital multimedia data signals may be communicated over a network from a signal source to a client system for viewing and listening by a user at the client site. In one scenario, a user requests the retrieval of a sequence of audio and video data signals called a stream from the signal source, which may be a server system communicating with the client system over the network. When the audio and video data signals making up the stream are received at the client, these multimedia data signals are processed to produce output data for the user in the form of sounds produced by one or more loudspeakers and images displayed on a display.

The concept of streaming multimedia includes a multimedia source sending a multimedia stream to a multimedia recipient for real-time presentation to a user. That is, streaming can be viewed as a "display/play" model as opposed to a more traditional "download and display/play" model, where the entire stream is collected by the recipient prior to presentation. Successful streaming is based on the premise that the multimedia preparation (e.g., compression) and the transmission mechanism can feed the recipient at a rate fast enough for the multimedia stream to be presented in real-time. Streaming may involve buffering a small amount of the stream prior to presentation, but the amount of buffering is typically small compared to the length of the entire stream. The rationale for buffering is typically to smooth out jitter inherent in network-based transmission mechanisms (e.g., packet-based transports, etc.).

One difference between "streaming multimedia" and multimedia that has been downloaded (in part or in its entirety) prior to presentation is that streaming multimedia quality (for example, video clarity and frame-rate) is determined, at least in part, by the bandwidth of the transmission mechanism. For downloaded multimedia, the quality of the presentation is typically unaltered from what it had been authored as; however, the download times are affected by the bandwidth of the transmission channel. A second difference between the two models is that the download model is not workable for "live" content. In a display/play model of a digital multimedia streaming system, the size of the displayed images and the overall quality of the audio and video presented to the user are limited at least in part by the bandwidth of the communications path between the signal source and the client. In some systems, a sufficient amount of audio and video data signals is received to display full-motion video and concurrent audio to the user in a real-time (or streaming) mode, although the size and quality of the displayed image may be inadequate or undesirable for some uses. If the bandwidth of the communications path could be expanded, then a larger image, a clearer image, or a smoother set of images could be presented to the user. However, in most systems, the communications path between the signal source and the client is a fixed, relatively low bandwidth communication channel having at least one bottleneck. For example, when the network is the Internet and the client is a computer system employing a modem with a purported maximum bandwidth of 56K bytes per second (bps), the modem may serve as an impediment to providing a clearer or larger display of the video images.

This limitation of a fixed bandwidth communications path is particularly acute when the client desires to retrieve streams from more than one signal source at a time. In some situations, a user may desire to display video data signals from at least two signal sources on a single display, with the data from each source being represented on a portion of the display. The display of two independent video streams, each in a portion of a display, is widely used for analog television signals as the "picture-in-a-picture" (PIP) feature of many analog televisions. However, for analog televisions, each video stream is received by a separate tuner on a different communications path and therefore the bandwidth of a single communications path for the dual sources is not fixed.

Simultaneous reception of two or more streams over a fixed, low bandwidth, digital communications path may result in bandwidth contention between the streams. Without some way to prioritize the client's reception of the streams, the streams may contend for the available, limited bandwidth. The data packets from the streams are thus received in a non-deterministic manner. The result may be that the reception and processing of the streams is degraded to the point where none of the streams conveys any significant visual information to the user. Typically, the user cannot select which stream to receive priority in the communications path to ensure that at least one of the streams conveys enough data signals for a suitable display to the user. In addition, reception of audio data signals for a stream may be degraded such that the client's audio output becomes intermittent and undesirable for the user.

What is needed is an approach or technique that addresses the foregoing problems.

SUMMARY

An embodiment of the present invention is a method of receiving digital multimedia data signals from multiple sources over a fixed bandwidth communications path using multiple layers of a stream. The method includes subscribing to a first layer of a first source, a first layer of a second source, and a second layer of the first source. The method further includes receiving data signals corresponding to the subscribed layers of the first and second sources in the stream over the fixed bandwidth communications path, and producing output signals corresponding to the received data signals for the first source and the second source.

Another embodiment of the present invention is a method of receiving multiple, independent digital multimedia streams over a fixed bandwidth communications path. The method includes subscribing to first and second streams, the first stream corresponding to a first multimedia content and the second stream corresponding to a second multimedia content. The method further includes concurrently receiving data signals corresponding to the streams over the fixed bandwidth communications path, and producing output signals corresponding to the received data signals for the first stream and for the second stream.

BRIEF DESCRIPTION OF THE DRAWINGS

The features and advantages of the present invention will become apparent from the following detailed description of the present invention in which.

DETAILED DESCRIPTION

An embodiment of the present invention includes a method whereby a client receives at least two real-time independent streams or at least two layers of a stream containing digital video data signals over a fixed bandwidth communications path with user control of which stream or layer is "in focus" as the primary source of display data and which stream or layer is a secondary source for display data. In one embodiment, the method may be accomplished using scaleable audio and video coding. An embodiment of the present invention provides a picture-in-picture (PIP) capability to live video streaming over a communications channel with limited bandwidth (such as a dial-up Internet connection, for example). This enables new functions for network streaming video applications (such as Internet streaming, for example) and may be used to improve streaming applications that incorporate a greater degree of user-interactivity and improved usability.

In one embodiment of the present invention, a client system may receive a single stream of video data signals, the single stream comprising multiple layers, each layer being communicated from a different video data source and containing video data signals of a portion of a selected multimedia content. The client system may present video data signals from a first source for display in a primary portion of a display while simultaneously displaying video data signals from a second source in a secondary portion of the display. At the direction of the user via a graphical user interface, the client system may then switch the bandwidth partitioning of the stream so that video data signals from the first source may be displayed in the secondary portion of the display and video data signals from the second source may be displayed in the primary portion of the display. The video data signals from each of the sources may be carried by layers of the stream and may be received over the same limited bandwidth communications path. However, the allocation of the bandwidth between the primary and secondary sources changes according to the user selection.

Figure 1:
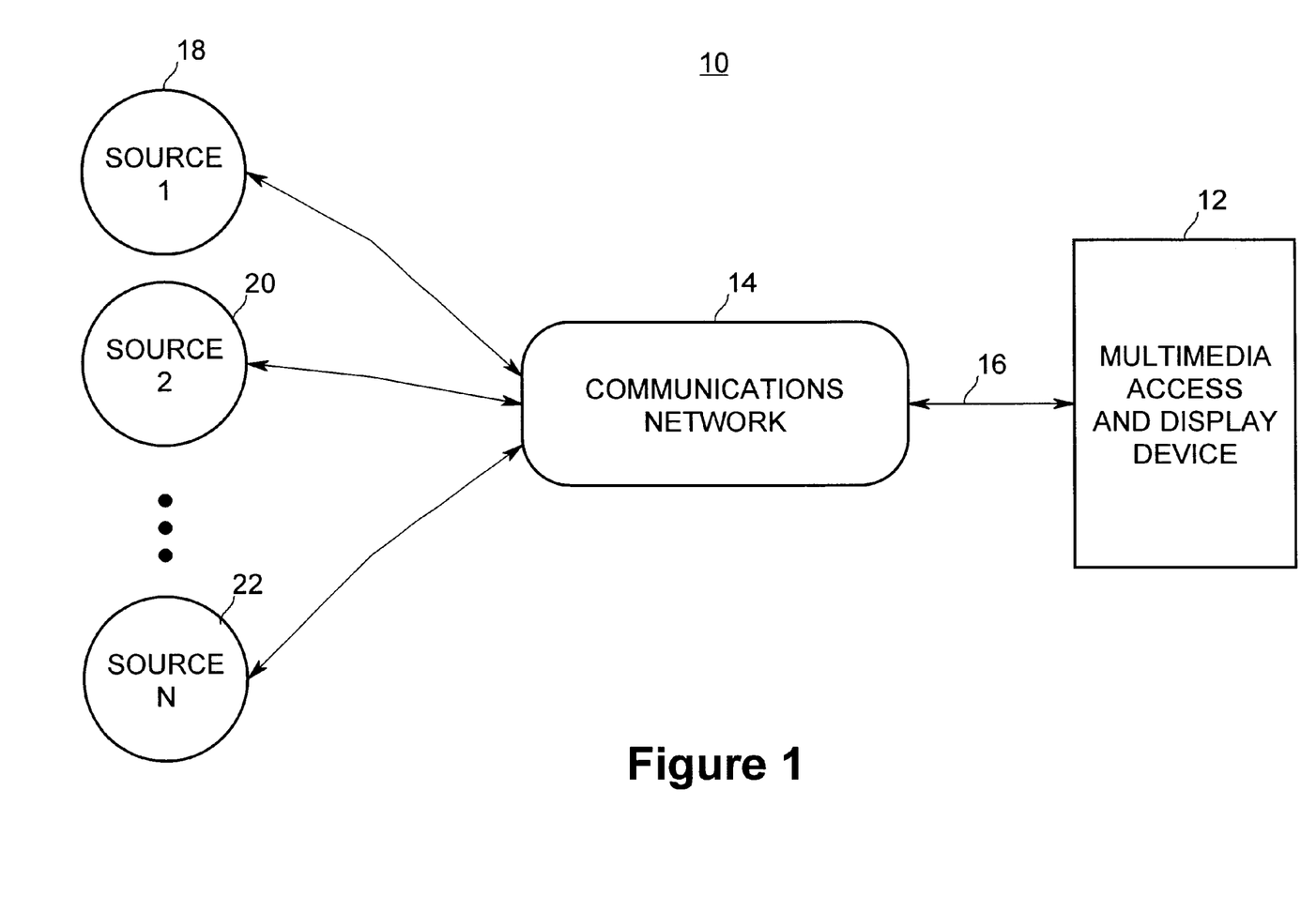
FIG. 1 is a diagram of a system for multiple source real-time video streaming over a network according to one embodiment of the present invention.

FIG. 1 is a diagram of a system 10 for multiple source real-time video streaming over a network according to one embodiment of the present invention. A multimedia access and display device 12 may be coupled to a communications network 14 by a communications path 16. Multimedia access and display device 12 may be any device for receiving, processing and displaying audio and video streams, such as, for example, a personal computer (PC) or other computer system having a display, a set-top box, an Internet appliance, a JAVA terminal, an information kiosk, or a digital television (DTV), although the invention is not limited in this respect. Communications network 14 may be any network for coupling computing devices such as, for example, a local area network (LAN), a wide area network (WAN), an intranet, or the Internet, although the invention is not limited in this respect. The connection between communications network 14 and multimedia access and display device 12 represented by communications path 16 may be any link with a predefined maximum data bandwidth, such as, for example, modem-based dial-up connections, various types of digital subscriber line (DSL) connections, cable modem connections, wireless connections, or network interface card (NIC) based intranet connections, although the invention is not limited in this respect. For purposes of this embodiment, only a fixed maximum bandwidth for communications path 16 is stipulated, however, the actual data rate for the communications path may vary with time without exceeding the maximum value. Additionally, the communications path supports bi-directional data flow (although not necessarily symmetrical in terms of bandwidth for each direction of data flow).

A plurality of signal sources Source 1 18, Source 2 20, ..., Source N 22 may be coupled to communications network 14 to serve as multimedia content repositories accessed by multimedia access and display device 12. In one embodiment, the number of signal sources actively serving multimedia access and display device 12 may be two. In other embodiments, any number of signal sources may be active and available for serving multimedia data streams to multimedia access and display devices at any time. Each signal source stores or has access to at least a portion of a digital multimedia content represented as a sequence of audio and video data signals called streams. The multimedia content may be stored at a signal source site in a main memory, a secondary memory, or a storage medium such as, for example, a CD-ROM, a digital versatile disk (DVD), or other suitable apparatus. As used herein, a stream comprises a plurality of audio and/or video data signals and the stream may comprise multiple layers. Each layer of a stream may comprise data from a source. The multimedia content may also be acquired in real-time from live audio and/or video sources such as, for example, a video camera and a microphone.

When a user of multimedia access and display device 12 desires to hear and/or view selected multimedia content, the user indicates his or her selection to multimedia access and display device 12 in any one of many well-known ways, such as, for example, by using a pointing device or keyboard and a graphical user interface and/or a browser application. In one embodiment, specific desired multimedia content may be identified by a uniform resource locator (URL) and/or identifiers according to the well-known hyper text transport protocol (HTTP), although the invention is not limited in scope in this respect. Multimedia access and display device 12 interacts with a signal source having the desired content to initiate the sending of a stream of audio and/or video data signals representing the desired content over communications network 14. Upon reception, multimedia access and display device produces audio and/or video output signals to the user based at least in part on the received stream. In the case of video output data, the video may be displayed on at least a first portion of a display. In the case of audio output data, the audio may be produced by at least one loudspeaker (not shown).

Subsequent to initiation of transmission of a stream of video data signals from a first source, the user may desire to substantially simultaneously receive data signals from one or more additional sources. Additional sources may be initiated and transmitted in a manner similar to the first source. However, additional processing may be employed to ensure that multiple sources are authored by multimedia content providers, transmitted by signal sources, and received by multimedia access and display devices in such a way as to provide substantially simultaneous display of the data signals from multiple sources on different portions of a display at a quality that is acceptable to the user.

Figure 2:
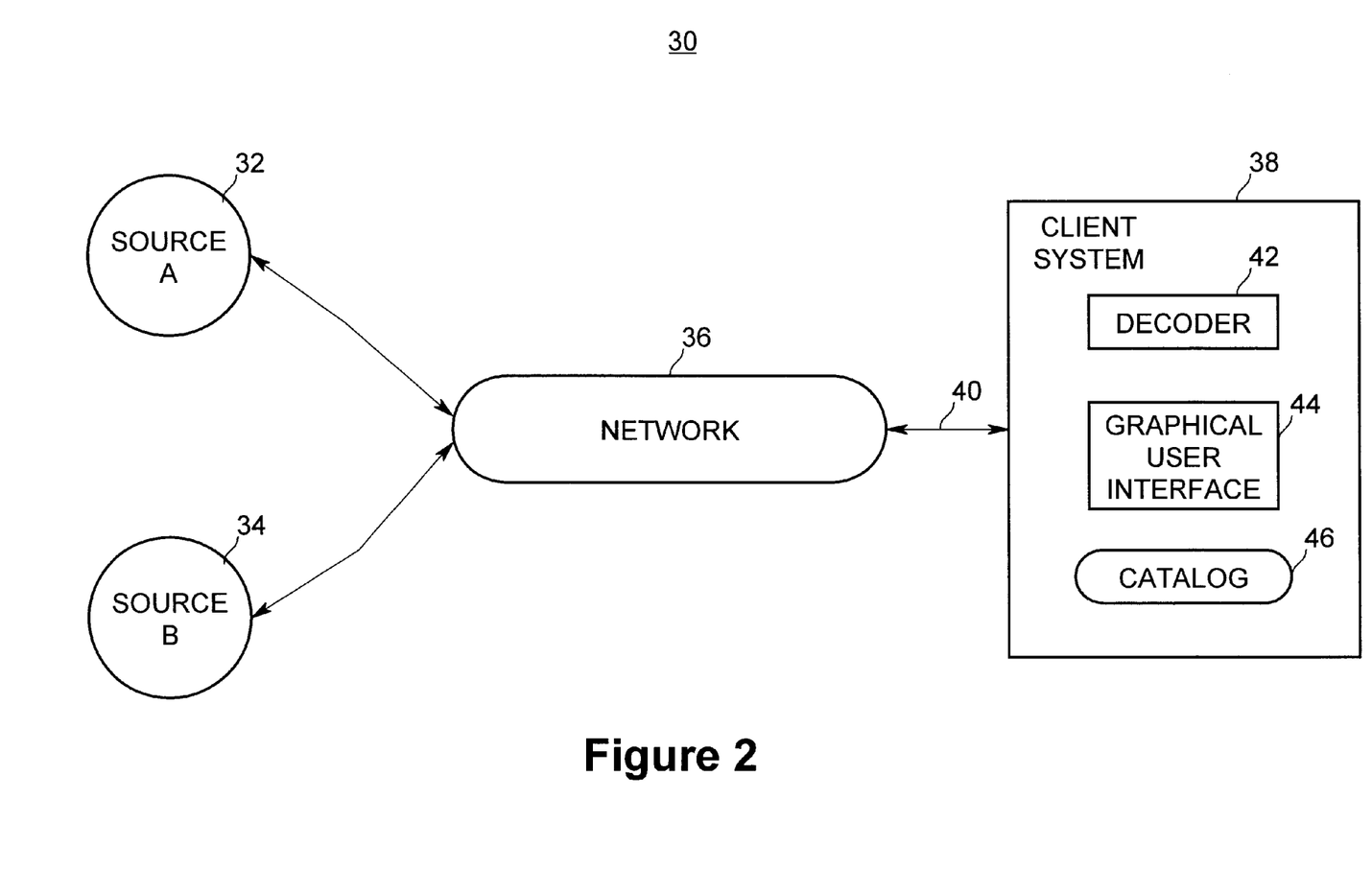
FIG. 2 is a diagram of a system for dual source real-time video streaming over a network according to another embodiment of the present invention.

Such processing may be best understood with reference to a specific example system having two active signal sources. However, the invention is not limited in scope to having only two active signal sources and in some embodiments any number of active signal sources may be handled according to the teachings of the present invention. FIG. 2 is a diagram of a system 30 for dual source real-time video streaming over a network according to another embodiment of the present invention. In this embodiment of the present invention, there are two active signal sources, Source A 32 and Source B 34. Generally, these sources may be any systems having access to multimedia content. In one embodiment, signal sources A 32 and B 34 may comprise server computer systems coupled to computer network 36. In another embodiment, the signal sources comprise a single server system. In one embodiment, the computer network may be the Internet. In various embodiments, the signal sources may be structured to provide streaming layered video streams authored to conform to International Telecommunications Union (ITU) Video Coding for Low Bit Rate Communication, Recommendation H.263, version 2, 1998 (also known as "H.263+"), and to accommodate network connections up to 56 Kbps. The H.263+ specification provides for scaleable video coding by allowing the total bandwidth of a single stream to be divided into separate layers of data for a given video signal source, each layer corresponding to a different quality level associated with the video. Further information relating to layered streams may be found in Annex O of the H.263+ specification. The layered video encoding strategy employed by H.263+ implementations provides the capability to subscribe to primary and secondary layers of a stream at different data rates, thereby enabling a PIP mode of operation.

Of course, the use of the H.263 specification to define the format of the stream and the 56 Kbps limit on the network connection is only representative of various embodiments of the present invention and the invention is not limited in scope in these respects.

A client system 38 (such as a personal computer system, for example) may be coupled to network 36 over a communications path 40 as a multimedia access and display device. Communications path 40 comprises a fixed bandwidth communications link (for example, a 56 Kbps link). Client system 38 may comprise a decoder 42 for decoding H.263+ layered streams received by the client and a graphical user interface 44 for displaying the video data signals of the streams to the user and accepting user input selections. Graphical user interface 44 may be used to select a desired multimedia content as a primary source for a first layer of a stream and another multimedia content as a secondary source for a second layer of the stream. Audio data associated with both the primary and secondary sources may be compressed for a resulting constant data rate of 8 Kbps in this embodiment. The audio data signals may be transmitted to the client system on an audio stream. The configurations of layers used to encode video streams may be stored in catalog 46 that may be transmitted to client system 38 at the time a multimedia transfer is initiated. The catalog may comprise subscription options and information regarding whether a particular stream may be used in a PIP mode of operation.

In one embodiment, the individual video streams may be authored to support configurations in accordance with Annex O of the H.263+ specification. Annex O defines three scalability features termed temporal, signal to noise ratio (SNR), and spatial scalability. With temporal scalability, an encoder generates bi-directionally predicted frames (also called true B frames). These frames support scalability in the sense that they may be discarded without hindering the decoding of surrounding frames in the stream. For example, these frames maybe dropped at the decoder side to reduce the display frame rate (thus scaling processor usage), or they may be dropped at the encoder side of a multi-point connection, to free up bandwidth on low capacity communications channels. True B frames also offer the advantage that they may be compressed more efficiently than predicted (P) frames, at approximately the same quality level.

SNR scalability is a technique where the error introduced by compression is itself encoded and transmitted as a separate H263+ encoded picture. At the receiving end, this enhancement layer picture may be decoded and added back to the base picture to yield a higher quality image than if just a base picture was decoded. Since compression of the error picture is itself lossy, the remaining error after that compression may be interpreted as yet another picture, and may be compressed and transmitted as yet another enhancement layer. The H.263+ specification supports up to 14 enhancement layers in this manner, with the bandwidth allocated to each layer by an authoring application.

Spatial scalability is a variation of SNR scalability, where an enhancement layer may be four times as large (twice the dimensions) as the lower layer. This allows a common interchange format (CIF) Input sequence, for example, to be encoded as both a base layer quarter common interchange format (QCIF) sequence and an enhancement layer CIF sequence. Frame rate scalability is another feature available with SNR and spatial scalability. With frame rate scalability, an enhancement layer may comprise more frames per second than a base layer.

In an embodiment of the present invention, the video stream may comprise a plurality of layers including a base layer (L0) at a data rate of 8 K BPS, supporting 5 frames per second (fps) of a 80 pixel by 60 pixel video image and an intracoded frame-predicted frame-predicted frame (IPP) profile; an enhancement layer 1 (L1, reference layer L0) at a data rate of 8 K BPS, providing a SNR layer, supporting 5 fps of an 80 pixel by 60 pixel video image and an IPP profile; an enhancement layer 2 (L2, reference layer L1) at a data rate of 10 K BPS, providing a spatial layer, supporting 5 fps of a 160 pixel by 120 pixel video image and an IPP profile; and an enhancement layer 3 (L3, reference layer L2) at a data rate of 10 K BPS, providing a temporal layer, supporting 15 fps of a 160 pixel by 120 pixel video image and a multiple temporal scalability frame (BBBB) profile. The scalability configuration described herein is an example of one embodiment and not the only stream configuration that may be used with the present invention. Furthermore, the data rates, frame rates, and image sizes discussed above are but one example of a layered stream configuration. One skilled in the art will appreciate that these parameters may be changed in other embodiments and this specific example will not serve to limit the scope of the present invention.

According to this configuration of layers, the total bandwidth used by the client system subscribing to the base layer from one source and all base and enhancement layers from another source fits into the 56 K BPS communications path provided by communications path 40. This assumes that only one audio stream is subscribed to at any given point in time. Generally, multiple audio streams are mutually exclusive and the audio data signals communicated to the client system correspond to the primary source. In one embodiment, the audio stream may be included as a separate layer within the stream.

Figure 3:
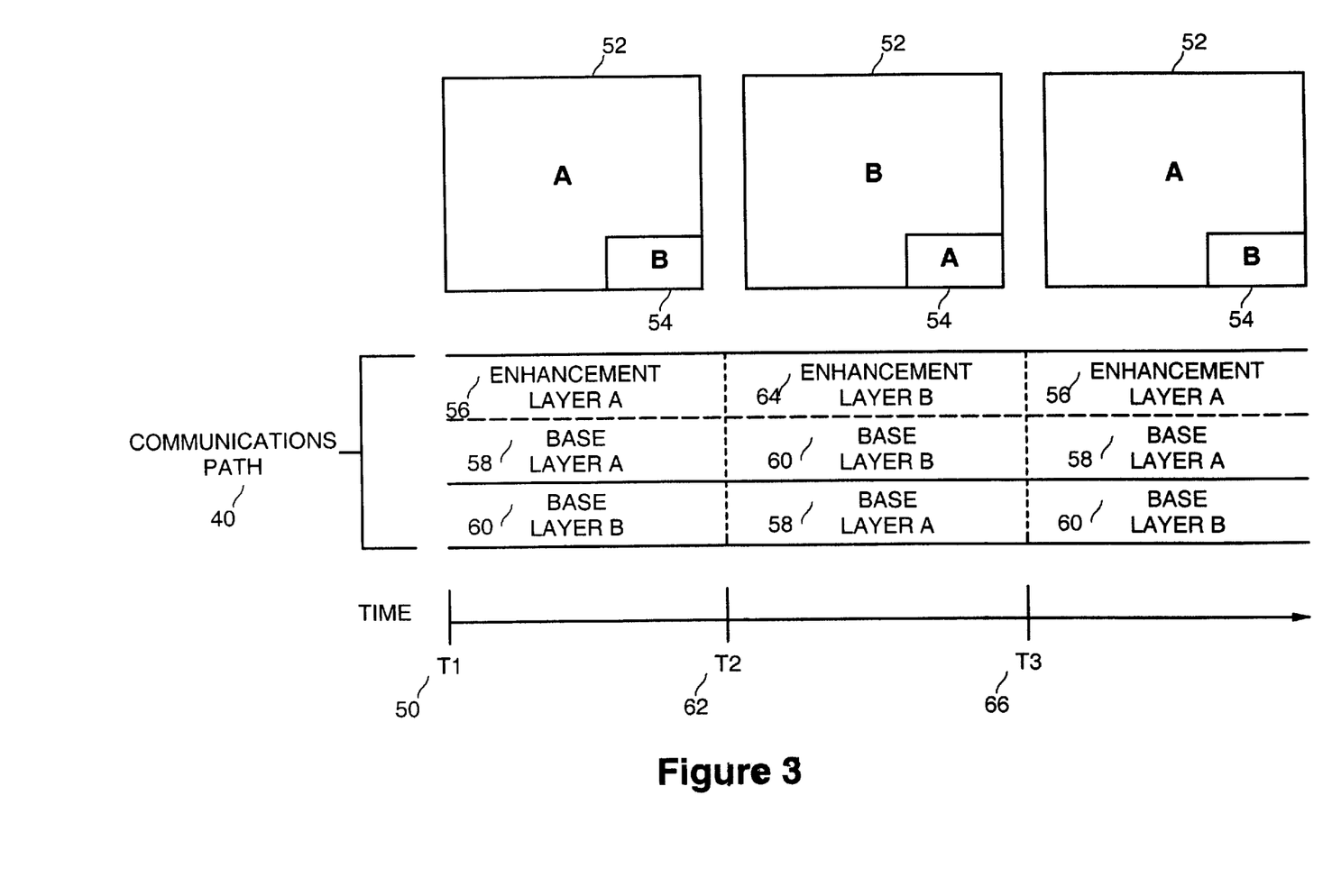
FIG. 3 is a diagram illustrating bandwidth partitioning of a communications path and corresponding video images according to one embodiment of the present invention.

In this embodiment, the low bandwidth base layer (L0) may be used as a "preview" layer to provide PIP capability. FIG. 3 is a diagram illustrating the bandwidth partitioning of a communications path and corresponding video images according to one embodiment of the present invention. At time T1 50, a user of client system 38 selects the multimedia content from signal source A 32 as the primary source of the stream and the multimedia content from signal source B 34 as a secondary source of the stream. As a result of this selection, video data from the primary source may be shown on a display in a first portion 52 of the screen, and video data from the secondary source may be shown on the display in a second portion 54 of the screen, thereby providing PIP capability. The first portion may be larger than the second portion because more information for display is being received for the primary source as compared to the secondary source. In this example, the secondary source data ("B") is shown in a rectangle in the lower right corner of the screen. However, this is only an example and other sizes, shapes, and placements may be used.

In the configuration of layers at time T1, the client system subscribes to the enhancement layer 56 and a base layer 58 of signal source A 32, and a base layer 60 of signal source B 34. Both base layers and the enhancement layers are transmitted along fixed bandwidth communications path 40. The two decoded video sequences from these layers may be displayed in the PIP format as shown. The client system also subscribes to an audio stream corresponding to the primary source (at time T1, this is from signal source A). At some time T2 62, the user may decide to switch the focus between the two windows. This may be indicated by double clicking a computer mouse button when a mouse pointer is over the PIP area, for example, although any method of indicating input to the graphical user interface may be employed. As a result of the switch indication, the client changes the current subscription of sources to accept only the base layer 58 of signal source A, but to accept the base layer 60 and the enhancement layers 64 of signal source B. This results in a change to the display whereby video data signals from signal source B are the primary source shown in the first portion 52 of the screen and video data signals from signal source A are the secondary source shown in the second portion 54 of the screen. The switch may be delayed by a small time interval so that subscription changes may be synchronized with key frames in the stream that are assumed to be present at regular intervals. At the time of the switch, the audio subscription may also be changed to maintain the association with the appropriate source selected as the primary source.

At time T3 66, a user may desire to switch back to signal source A as the primary source. As a result of the switch indication, the client changes the current subscription of sources to accept only the base layer 60 of signal source B, but to accept the base layer 58 and the enhancement layers 56 of signal source A. This results in a change to the display whereby video data signals from signal source A are again the primary source shown in the first portion 52 of the screen and video data signals from signal source B are again the secondary source shown in the second portion 54 of the screen.

Figure 4:
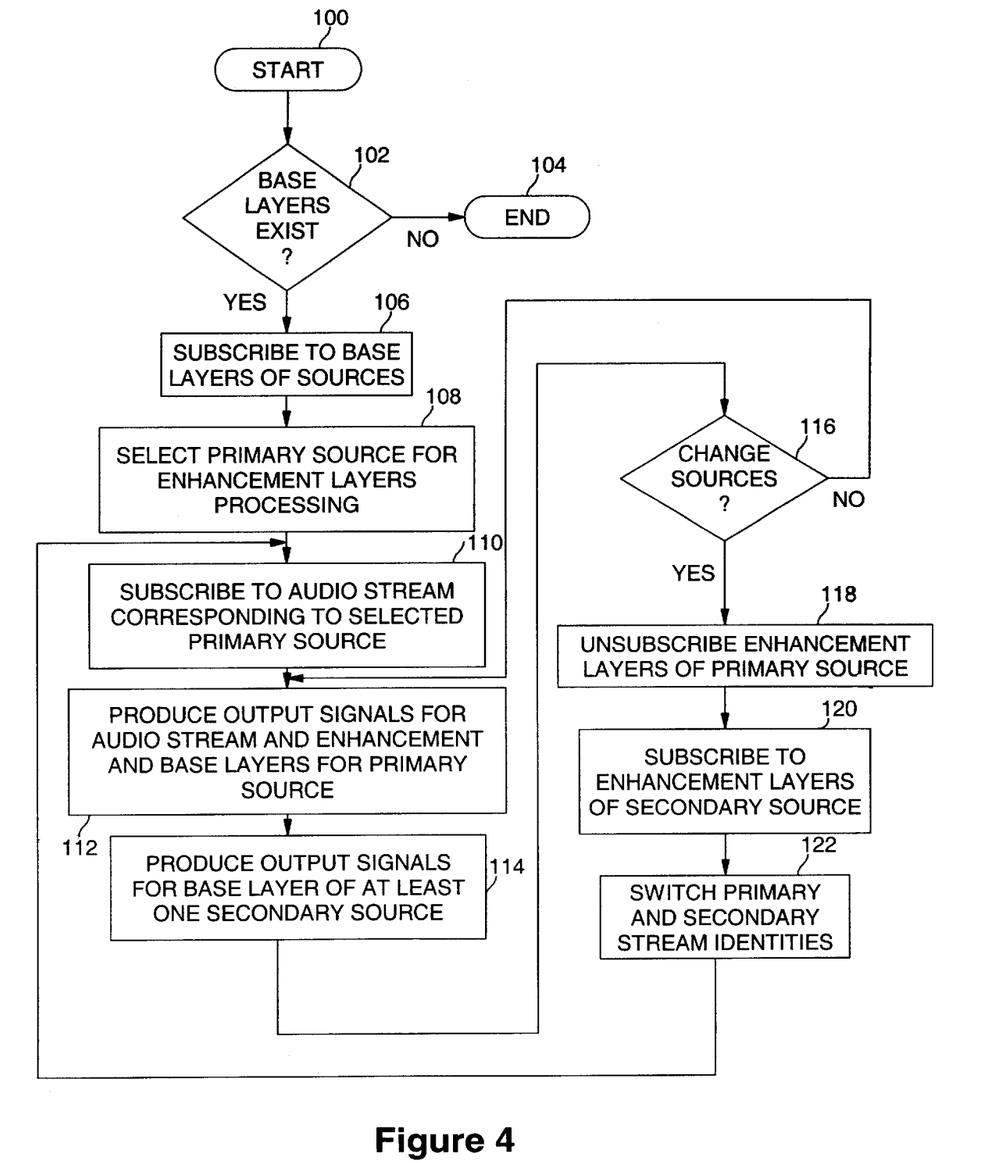
FIG. 4 is a flow diagram of controlling bandwidth partitioning of multiple layers of a stream according to an embodiment of the present invention.

FIG. 4 is a flow diagram of controlling bandwidth partitioning of multiple layers of a stream according to an embodiment of the present invention. After start 100, a client system determines if base layers exist for at least two signal sources at block 102. If a single base layer or no base layers exist, then multiple source streaming processing ends at block 104. If at least one base layer exists for each source, the client system subscribes to the base layers of the sources at block 106, with each source providing data for a base layer of the video stream. Next, at block 108, a primary source may be selected for subscription and subsequent processing of the enhancement layers associated with the primary source. At block 110, the audio data stream for the selected primary source may be subscribed to for subsequent reception and production of audible sounds. After these actions, the video stream being received by the client system comprises base layers for at least two signal sources and enhancement layers for one signal source. The client system may also receive an audio stream corresponding to the signal source of the enhancement layers. At block 112, the output signals for the audio stream and enhancement layers and base layer of the primary source may be produced for reception by the user of the client system. This action may comprise rendering the video data signals from the base and enhancement layers of the video stream on a display and generating audible sounds through at least one loudspeaker from the audio data signals of the audio stream. The audible sounds may be generated in synchronization with the displayed images from the base and enhancement layers. The video data signals may be rendered to a first portion of the display. At block 114, the output signals for the base layer of secondary source may be produced for reception by the user of the client system. This action may comprise rendering the video data signals from the base layer to a second portion of the display.

When the client system is in this configuration, the user may view a continual stream of data from a first multimedia content in a first portion of the display and a second multimedia content in a second portion of the display (e.g., a PIP display). At some point in time, the user may desire to change the selection of the primary source. For example, this could be accomplished by double clicking a mouse button with a mouse pointer over an area of the display or an equivalent keyboard action. When such an action is taken, the subscription for the selected portion of the display may be changed to become the new primary source. At block 116, it may be determined if changing of the sources is desired (e.g., by recognizing an appropriate input event). If no change is indicated, then processing continues by producing more output signals from the received audio and video streams at block 112. If a change is indicated, then the enhancement layers of the primary source are unsubscribed at block 118. At block 120, the client system subscribes to the enhancement layers of the secondary source. At block 122, the identities of the primary and secondary sources are switched or otherwise exchanged (i.e., the primary source becomes the secondary source and vice versa). Processing continues with block 110.

In an alternate embodiment of the present invention, the digital multimedia content may be authored as multiple independent streams as opposed to a single stream having multiple layers. In one embodiment, the multiple independent streams may be authored according to the SmartStream™ streaming multimedia content technology commercially available from Real Networks, Inc., although the present invention is not limited in scope in this respect. Unlike the layered approach used by the H.263+ specification to address bandwidth (and processor) scalability, SmartStream™ technology is a non-additive method of encoding a video sequence into a set of independent streams by choosing a different set of encoding parameters for each stream. The streams are independent in the sense that each stream may be decoded without any information from the other streams. From the multimedia content author's point of view, the author may choose to take the same video content and encode it with different encoding parameters (e.g., data rate, frame rate, video size), storing all the resultant streams in the same file. For example, one stream may comprise base layer video data signals while another stream may comprise enhancement layer video data signals. The client system may switch between the different available streams under conditions of changing bandwidth (for example, the client system may switch subscription from a high data rate stream to a lower data rate stream if the transmission channel bandwidth decreases suddenly) and processor load (for example, the client system may switch from a high frame rate stream to a lower frame rate stream to reduce the amount of processor usage in decoding the video data signals).

Referring back to FIG. 2, two active sources 32, 34 may be used, with each source streaming an independent H.263+ stream according to SmartStream™ video stream technology. These streams may be authored to accommodate connections up to a fixed data rate, such as 56 K BPS, for example. The client system 38 may be a personal computer using software that can decode H.263+ SmartStream™ video streams (e.g., decoder 42) and has a user interface (e.g., graphical user interface 44) to allow the user to select one of the streams as the primary (main) stream and the other as a secondary (preview) stream. Audio associated with both streams in one example may be compressed at 8 K BPS (constant bit rate streams).

The individual video streams representing digital multimedia content may be authored to support a configuration such as one having a first stream operating at 8 K BPS, and supporting a 5 fps data rate of a 80 pixel by 60 pixel video (e.g., a preview or base stream), and a second stream operating at 28 K BPS supporting a 15 fps data rate of a 160 pixel by 120 pixel video (e.g., a main or enhancement stream). The SmartStream™ configuration described above is an example and not the only one that may be used for purposes of the present invention. In this embodiment, a low bandwidth stream may be used as the preview stream and the total bandwidth used by a client system subscribing to the preview stream from one source and the main stream from the second source still fits in a fixed bandwidth communications channel (assuming only one audio stream is subscribed to any given point in time).

The configuration used to encode each video stream may be stored in a catalog 46 that is transmitted to an application on the client system 38 at the time the multimedia transfer is initiated. This allows the client system to detect at the start of the transfer what the subscription options are and to determine if a particular stream can be used in the manner described by an embodiment of the present invention.

In the preceding description, various aspects of the present invention have been described. For purposes of explanation, specific numbers, systems and configurations were set forth in order to provide a thorough understanding of the present invention. However, it is apparent to one skilled in the art that the present invention may be practiced without the specific details. In other instances, well-known features were omitted or simplified in order not to obscure the present invention.

Embodiments of the present invention may be implemented in hardware or software, or a combination of both. However, embodiments of the invention may be implemented as computer programs executing on programmable systems comprising at least one processor, a data storage system (including volatile and non-volatile memory and/or storage elements), at least one input device, and at least one output device. Program code may be applied to input data to perform the functions described herein and generate output information. The output information may be applied to one or more output devices, in known fashion. For purposes of this application, a processing system includes any system that has a processor, such as, for example, a digital signal processor (DSP), a microcontroller, an application specific integrated circuit (ASIC), or a microprocessor.

The programs may be implemented in a high level procedural or object oriented programming language to communicate with a processing system. The programs may also be implemented in assembly or machine language, if desired. In fact, the invention is not limited in scope to any particular programming language. In any case, the language may be a compiled or interpreted language.

The programs may be stored on a storage media or device (e.g., hard disk drive, floppy disk drive, read only memory (ROM), CD-ROM device, flash memory device, digital versatile disk (DVD), or other storage device) readable by a general or special purpose programmable processing system, for configuring and operating the processing system when the storage media or device is read by the processing system to perform the procedures described herein. Embodiments of the invention may also be considered to be implemented as a machine-readable storage medium, configured for use with a processing system, where the storage medium so configured causes the processing system to operate in a specific and predefined manner to perform the functions described herein.

Figure 5:
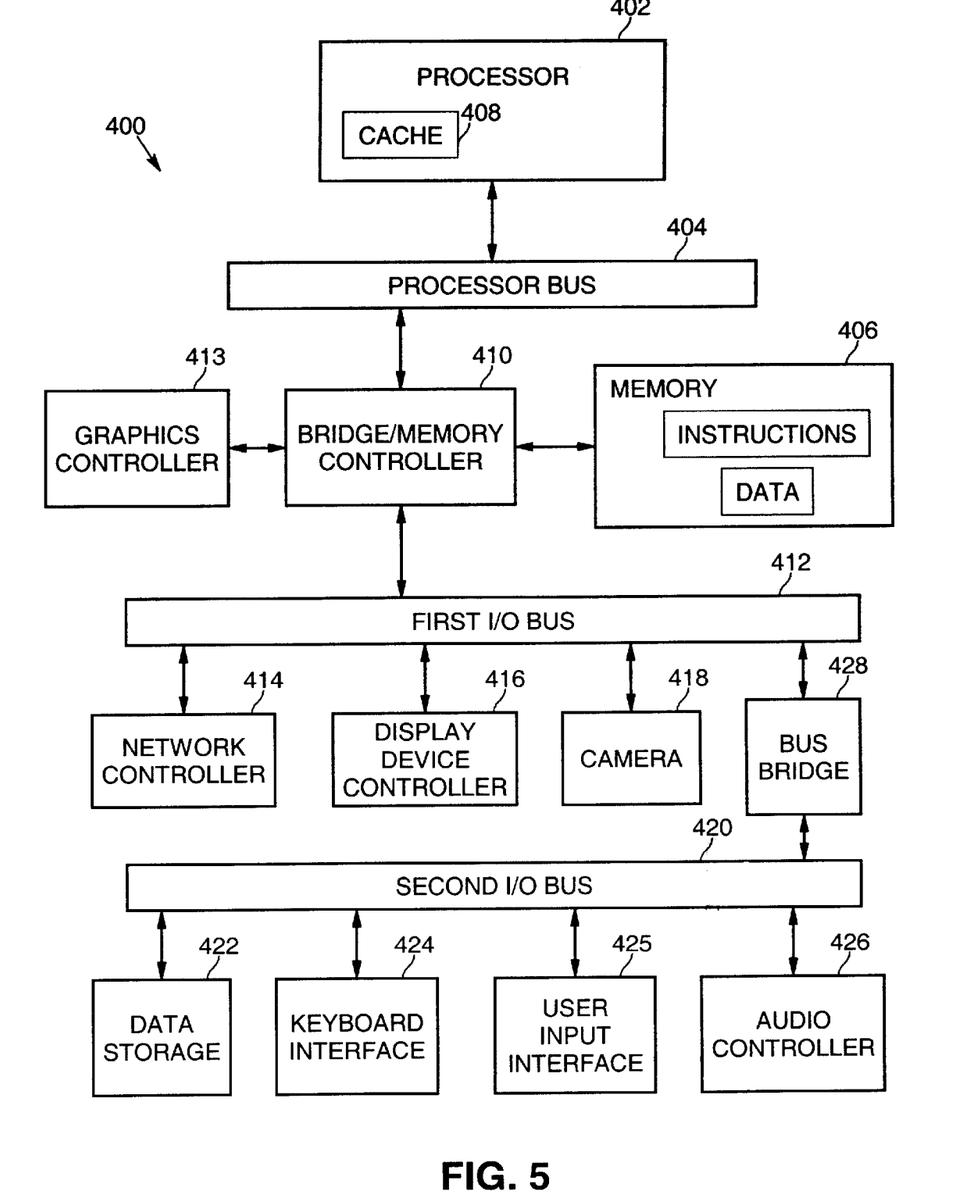
FIG. 5 is a diagram illustrating a sample system suitable to be programmed according to an embodiment of a method for streaming video from multiple sources over a network.

An example of one such type of processing system is shown in FIG. 5. Sample system 400 may be used, for example, to execute the processing for methods in accordance with the present invention, such as the embodiment described herein. Sample system 400 is representative of processing systems based on the PENTIUM®, PENTIUM® Pro, and PENTIUM® II microprocessors available from Intel Corporation, although other systems (including personal computers (PCs) having other microprocessors, engineering workstations, set-top boxes and the like) may also be used. In one embodiment, sample system 400 may be executing a version of the WINDOWS™ operating system available from Microsoft Corporation, although other operating systems and graphical user interfaces, for example, may also be used.

FIG. 5 is a block diagram of a system 400 of one embodiment of the present invention. The computer system 400 includes a processor 402 that processes data signals. The processor 402 may be a complex instruction set computer (CISC) microprocessor, a reduced instruction set computing (RISC) microprocessor, a very long instruction word (VLIW) microprocessor, a processor implementing a combination of instruction sets, or other processor device, such as a digital signal processor, for example. FIG. 5 shows an example of an embodiment of the present invention implemented as a single processor system 400. However, it is understood that embodiments of the present invention may alternatively be implemented as systems having multiple processors. Processor 402 may be coupled to a processor bus 404 that transmits data signals between processor 402 and other components in the system 400.

System 400 includes a memory 406. Memory 406 may be a dynamic random access memory (DRAM) device, a static random access memory (SRAM) device, or other memory device. Memory 406 may store instructions and/or data represented by data signals that may be executed by processor 402. The instructions and/or data may comprise code for performing any and/or all of the techniques of the present invention. Memory 406 may also contain additional software and/or data (not shown). A cache memory 408 may reside inside processor 402 that stores data signals stored in memory 406. Cache memory 408 in this embodiment speeds up memory accesses by the processor by taking advantage of its locality of access. Alternatively, in another embodiment, the cache memory may reside external to the processor.

A bridge/memory controller 410 may be coupled to the processor bus 404 and memory 406. The bridge/memory controller 410 directs data signals between processor 402, memory 406, and other components in the system 400 and bridges the data signals between processor bus 404, memory 406, and a first input/output (I/O) bus 412. In some embodiments, the bridge/memory controller provides a graphics port for coupling to a graphics controller 413. In this embodiment, graphics controller 413 interfaces to a display device (not shown) for displaying images rendered or otherwise processed by the graphics controller 413 to a user. The display device may comprise a television set, a computer monitor, a flat panel display, or other suitable display device.

First I/O bus 412 may comprise a single bus or a combination of multiple buses. First I/O bus 412 provides communication links between components in system 400. A network controller 414 may be coupled to the first I/O bus 412. The network controller links system 400 to a network that may include a plurality of processing systems (not shown in FIG. 3) and supports communication among various systems. The network of processing systems may comprise a local area network (LAN), a wide area network (WAN), the Internet, or other network. In some embodiments, a display device controller 416 may be coupled to the first I/O bus 412. The display device controller 416 allows coupling of a display device to system 400 and acts as an interface between a display device (not shown) and the system. The display device may comprise a television set, a computer monitor, a flat panel display, or other suitable display device. The display device receives data signals from processor 402 through display device controller 416 and displays information contained in the data signals to a user of system 400.

In some embodiments, camera 418 may be coupled to the first I/O bus. Camera 418 may comprise a digital video camera having internal digital video capture hardware that translates a captured image into digital graphical data. The camera may comprise an analog video camera having digital video capture hardware external to the video camera for digitizing a captured image. Alternatively, camera 418 may comprise a digital still camera or an analog still camera coupled to image capture hardware. A second I/O bus 420 may comprise a single bus or a combination of multiple buses. The second I/O bus 420 provides communication links between components in system 400. A data storage device 422 may be coupled to the second I/O bus 420. The data storage device 422 may comprise a hard disk drive, a floppy disk drive, a CD-ROM device, a flash memory device, or other mass storage device. Data storage device 422 may comprise one or a plurality of the described data storage devices.

A keyboard interface 424 may be coupled to the second I/O bus 420. Keyboard interface 424 may comprise a keyboard controller or other keyboard interface device. Keyboard interface 424 may comprise a dedicated device or may reside in another device such as a bus controller or other controller device. Keyboard interface 424 allows coupling of a keyboard to system 400 and transmits data signals from a keyboard to system 400. A user input interface 425 may be coupled to the second I/O bus 420. The user input interface may be coupled to a user input device, such as a mouse, joystick, or trackball, for example, to provide input data to the computer system. Audio controller 426 may be coupled to the second I/O bus 420. Audio controller 426 operates to coordinate the recording and playback of audio signals. A bus bridge 428 couples first I/O bridge 412 to second I/O bridge 420. The bus bridge operates to buffer and bridge data signals between the first I/O bus 412 and the second I/O bus 420.

Embodiments of the present invention are related to the use of the system 400 to receive multiple digital multimedia streams. According to one embodiment, reception of user-selectable multiple digital multimedia streams may be performed by the system 400 in response to processor 402 executing sequences of instructions in memory 406. Such instructions may be read into memory 406 from another computer-readable medium, such as data storage device 422, or from another source via the network controller 414, for example. Execution of the sequences of instructions causes processor 402 to receive multiple digital multimedia streams according to embodiments of the present invention. In an alternative embodiment, hardware circuitry may be used in place of or in combination with software instructions to implement embodiments of the present invention. Thus, the present invention is not limited to any specific combination of hardware circuitry and software.

The elements of system 400 perform their conventional functions well-known in the art. In particular, data storage device 422 may be used to provide long-term storage for the executable instructions and data structures for embodiments of methods of receiving streaming multimedia data signals from multiple sources in accordance with the present invention, whereas memory 406 is used to store on a shorter term basis the executable instructions of embodiments of the methods for receiving streaming multimedia data signals from multiple sources in accordance with the present invention during execution by processor 402.

While this invention has been described with reference to illustrative embodiments, this description is not intended to be construed in a limiting sense. Various modifications of the illustrative embodiments, as well as other embodiments of the invention, which are apparent to persons skilled in the art to which the inventions pertains are deemed to lie within the spirit and scope of the invention.

What is claimed is:

1. A method of receiving digital multimedia data signals from multiple sources in a stream communicated over a fixed bandwidth communications path comprising:

subscribing to a first layer of a first source, a first layer of a second source, and a second layer of the first source;

receiving data signals corresponding to the subscribed layers of the first and second sources in the stream over the fixed bandwidth communications path;

producing output signals corresponding to the received data signals for the first source and for the second source;

displaying the output signals for the first source in a first portion of a display;

substantially simultaneously displaying the output signals for the second source in a second portion of the display;

unsubscribing the second layer of the first source; and subscribing to a second layer of the second source.

2. The method of claim 1, wherein the first layer of the first source comprises a base layer of the stream, the second layer of the first source comprises an enhancement layer of the stream, and the first layer of the second source comprises another base layer of the stream.

3. The method of claim 1, further comprising:
subscribing to a third layer of the first source, the third layer comprising audio data signals;
receiving data signals corresponding to the third layer of the first source in a second stream over the fixed bandwidth communications path; and
producing audio output signals corresponding to the received data signals for the third layer.

4. The method of claim 1, wherein the second layer of the second source comprises an enhancement layer of the second stream.

5. The method of claim 1, further comprising:
displaying the output signals for the first source in the second portion of a display; and
substantially simultaneously displaying the output signals for the second source in the first portion of the display.

6. The method of claim 5, further comprising:
unsubscribing the second layer of the second source; and
subscribing to the second layer of the first source.

7. The method of claim 6, further comprising:
displaying the output signals for the first source in the first portion of a display; and
substantially simultaneously displaying the output signals for the second source in the second portion of the display.

8. An article comprising a machine readable medium having a plurality of machine readable instructions, wherein when the instructions are executed by a processor the instructions subscribe the processor to receive a first layer of a first source, a first layer of a second source, and a second layer of the first source, control the reception of data signals corresponding to the subscribed layers of the first and second sources in a stream over a fixed bandwidth communications path, produce output signals corresponding to the received data signals for the first source and the second source, display the output signals for the first source in a first portion of a display, substantially simultaneously display the output signals for the second source in a second portion of the display, unsubscribe the second layer of the first source, and to subscribe the processor to a second layer of the second source.

9. The article of claim 8, further comprising instructions to subscribe the processor to a third layer of the first source, the third layer comprising audio data signals, to receive data signals corresponding to the third layer in a second stream over the fixed bandwidth communications path, and to produce audio output signals corresponding to the received data signals for the third layer.

10. The article of claim 8, further comprising instructions to display the output signals for the first source in the second portion of a display, and to simultaneously display the output signals for the second source in the first portion of the display.

11. The article of claim 10, further comprising instructions to unsubscribe the second layer of the second source; and to subscribe the processor to the second layer of the first source.

12. A method of streaming digital multimedia data signals of multiple sources from at least one server system in a layered stream over a fixed bandwidth communications path in a network to a client system comprising:

subscribing to base layers of the multiple sources;
subscribing to an enhancement layer of a selected one of the sources;
receiving the base layers and the enhancement layer in the layered stream over the fixed bandwidth communications path at the client system;
displaying the base layer and the enhancement layer of the selected source in a first portion of a display of the client system;
substantially simultaneously displaying the base layer of at least one non-selected source in at least one other portion of the display; and
unsubscribing the enhancement layer of the selected source and subscribing to an enhancement layer of a newly selected source.

13. The method of claim 12, further comprising subscribing to an audio layer of the selected source, receiving the audio layer at the client system, and producing audio output signals in synchronization with the displaying of the base and enhancement layers of the selected source.

14. The method of claim 12, further comprising:
receiving the base layers of the sources and the enhancement layer of the newly selected source;
displaying the base layer and the enhancement layer of the newly selected source in the first portion of the display; and
substantially simultaneously displaying the base layer of at least one non-selected source in at least one other portion of the display.

15. The method of claim 12, further comprising controlling subscription of the enhancement layer by a user of the client system by a graphical user interface.

16. An article comprising a machine readable medium having a plurality of machine readable instructions, wherein when the instructions are executed by a processor of a client system the instructions subscribe the client system to base layers of multiple sources of multimedia data, subscribe the client system to an enhancement layer of a selected one of the sources, control the reception of the base layers and the enhancement layer in a layered stream over a fixed bandwidth communications path at the client system, display the base layer and the enhancement layer of the selected source in a first portion of a display of the client system, display the base layer of at least one non-selected source in at least one other portion of the display, unsubscribe the enhancement layer of the selected source and subscribe to an enhancement layer of a newly selected source.

17. The article of claim 16, further comprising instructions for subscribing to an audio layer of the selected source, receiving the audio layer at the client system, and producing audio output signals in synchronization with the displaying of the base and enhancement layers of the selected source.

18. The article of claim 16, further comprising instructions for
receiving the base layers of the sources and the enhancement layer of the newly selected source;
displaying the base layer and the enhancement layer of the newly selected source in the first portion of the display; and
substantially simultaneously displaying the base layer of at least one non-selected source in at least one other portion of the display.

19. The article of claim 16, further comprising instructions for controlling subscription of the enhancement layer by a user of the client system by a graphical user interface.

* * * * *